United States Patent [19]
Christie

[11] Patent Number: 5,297,122
[45] Date of Patent: Mar. 22, 1994

[54] DUST PROTECTION ASSEMBLY FOR MAGNETO-OPTIC DRIVE APPARATUS

[75] Inventor: Leslie G. Christie, Greeley, Colo.

[73] Assignee: Hewlett-Packard Company, Palo Alto, Calif.

[21] Appl. No.: 944,565

[22] Filed: Sep. 14, 1992

[51] Int. Cl.5 ............................................. G11B 17/32
[52] U.S. Cl. .................... 369/13; 360/114; 360/105; 360/107; 360/109; 369/75.1; 369/75.2
[58] Field of Search ................. 369/13, 75.1, 75.2, 369/71, 292, 215; 360/114, 105, 106, 107, 109, 128

[56] References Cited

U.S. PATENT DOCUMENTS

| | | | |
|---|---|---|---|
| 4,977,549 | 12/1990 | Berg | 369/13 |
| 5,103,435 | 4/1992 | Nemoto et al. | 369/13 |
| 5,111,350 | 5/1992 | Carey et al. | 369/13 |
| 5,124,961 | 6/1992 | Yamaguchi et al. | 369/114 |
| 5,191,562 | 3/1993 | Hensing et al. | 369/13 |

Primary Examiner—Robert J. Pascal
Assistant Examiner—Tan Dinh

[57] ABSTRACT

Apparatus and method for protecting the read/write lens of a magneto-optic drive apparatus using a tongue that covers the read/write lens during the opening and closing of the shutter on a cartridge as it is inserted into and as it is removed from the magneto-optic drive apparatus and during the period that the read/write lens is in a parked position. Apparatus also protects the turning lens and splitting lens and other optical components during insertion and removal of a cartridge and also when these components are in a parked position. The flow of cooling air is also controlled to prevent introduction of dust to the read/write lens and other optical components.

20 Claims, 3 Drawing Sheets

DUST PROTECTION ASSEMBLY FOR MAGNETO-OPTIC DRIVE APPARATUS

BACKGROUND OF THE INVENTION

This invention relates generally to magneto-optic drive apparatus and more particularly to apparatus for protecting the read/write lens and turning lens of such apparatus.

A conventional magneto-optic drive apparatus has a frame that is mounted in a housing. Optical disk drive means are mounted in the frame. Support means for supporting and moving an optical assembly, including a read/write lens and a turning lens mounted in a lens enclosure between an operating position and a parked position are mounted in an opening in the frame. When the magneto-optic drive apparatus is not operating, the read/write lens is placed in the parked position which is located between the drive means and the operating position. The lens enclosure is open at the rear and the top to allow a laser light beam to pass therethrough. In such an arrangement, the read/write lens and the turning lens are exposed to dust particles in the ambient air which may settle thereon.

The magneto-optic drive apparatus is provided with apparatus for opening a shutter on the cartridge as it is inserted into the magneto-optic drive apparatus and closing the shutter when the cartridge is removed from the magneto-optic drive apparatus. This opening and closing creates a great deal of additional dust in the air immediately above the optical assembly which may also settle on the read/write lens and turning lens. Build up of dust on the surfaces of the read/write lens and turning lens greatly effects the ability of the optical drive to read or write information. To prevent heat build up in the magneto-optic drive apparatus, it is important that cooling air be passed through the apparatus. The apparatus frame has an opening for accommodating the support means, and cooling air entering through this opening provides another source of dust to contaminate the read/write lens.

BRIEF DESCRIPTION OF THE INVENTION

This invention provides apparatus and method for protecting a read/write lens and a turning lens of a magneto-optic drive apparatus from dust contamination by covering the read/write lens and the turning lens when the lenses are in a parked position associated with the opening and closing of the shutter of the cartridge, and additionally by closing a bottom opening in the frame of the magneto-optic drive apparatus.

In a preferred embodiment of the invention, the apparatus of this invention comprises drive means for rotating an optical disk contained in a cartridge and a displaceable optical assembly mounted on support means for movement in linear directions between an operating position and a parked position. The optical assembly includes a read/write lens and turning lens used to focus and turn a laser beam for reading or writing information from or to a disk. The operating position of the optical assembly is located between the drive means and the parked position and protection means are provided for protecting the read/write lens when in the parked position. Mounting means are provided for mounting the protection means for movement between a first location whereat at least a portion of the protection means protects the displaceable optical assembly and a second location whereat the protection means permits operation of the optical assembly and the disk for reading or writing information from or to the disk. The read/write lens is located beneath an opening in a lens enclosure of the optical assembly; and the protection means comprises a strip of flexible, resilient material covering the opening when the optical assembly is in the parked position. The cartridge has a shutter mounted for movement between a closed portion and an opened position. Moving means are provided for moving the shutter between the closed and opened positions as the cartridge is inserted into or taken out of the magneto-optic drive apparatus. The moving means are constructed and arranged to operate only when the read/write lens is in the parked position and the protection means are at the first location. The apparatus further comprises a housing; frame means mounted at a fixed location in the housing; a carrier; and connecting means for connecting the carrier to the frame means to permit relative linear movement therebetween in generally vertical directions but to prevent any substantial relative linear movement therebetween in horizontal directions. The strip of flexible resilient material is secured to a shuttle mounted on the carrier for movement relative thereto in generally horizontal linear directions. Cam means are provided for moving the shuttle in generally horizontal linear directions relative to the carrier. The apparatus further comprises additional cam means for moving the carrier in generally vertical directions. The cam means and the additional cam means comprises cam grooves formed in the carrier and the shuttle; cam followers mounted for movement in horizontal linear directions on the frame means and having at least a portion thereof located in the cam grooves; a rack fixedly mounted on the cam follower; a motor mounted on the frame means; and rotatable gear means mounted on the motor to rotate a pinion gear in mesh with the rack to move the rack over the frame means so that the cam follower moves the carrier and the shuttle in the generally horizontal direction and then moves them in generally vertical linear directions. The apparatus further comprises an abutment mounted on the frame means. The mounting means are located at the second location when the carrier and the shuttle are moving in the linear vertical directions. The abutment is located on the frame means so that when the shuttle and the carrier are moving downwardly toward the frame, the strip of resilient flexible material will contact the abutment and pivot around a generally horizontal axis so that a free end of the strip of flexible material is moved generally upwardly away from the frame means. Locking means are provided for releasably locking the optical assembly in the parked position; and release means are provided on the shuttle for releasing the locking means as the protection means moves from the first location to the second location. Baffle means are secured to the frame means and face a bottom wall portion of the housing. The baffle means are located to close substantially the bottom portion of the opening in the frame means and openings are provided in opposite sidewall portions of the housing for passing cooling air between the baffle means and the bottom wall portion.

The invention also provides a preferred method for using the apparatus which method comprises locating the read/write lens in the parked position and the protection means in the first location; inserting the cartridge into the apparatus; moving the shutter from the closed position to the opened position as the cartridge is inserted into the magneto-optic drive apparatus; moving the protection means from the first location to the second location after the shutter has been opened; moving the read/write lens from the parked position to the operating position; performing the reading or writing operation; moving the read/write lens from the operating position to the parked position; moving the protection means from the second location to the first location; and removing the cartridge from said magneto-optic drive apparatus which functions to move the shutter from the opened position to the closed position. The step of performing the reading or writing operation comprises moving the carrier and therefore the cartridge downwardly until it is in a position to rotate the disk and moving the carrier and the cartridge upwardly to their original position prior to moving the protection means from the second location to the first location. The method further comprises providing a baffle to close the end of the opening remote from the read/write lens; and passing cooling air between the baffle and the bottom wall portion of the housing.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
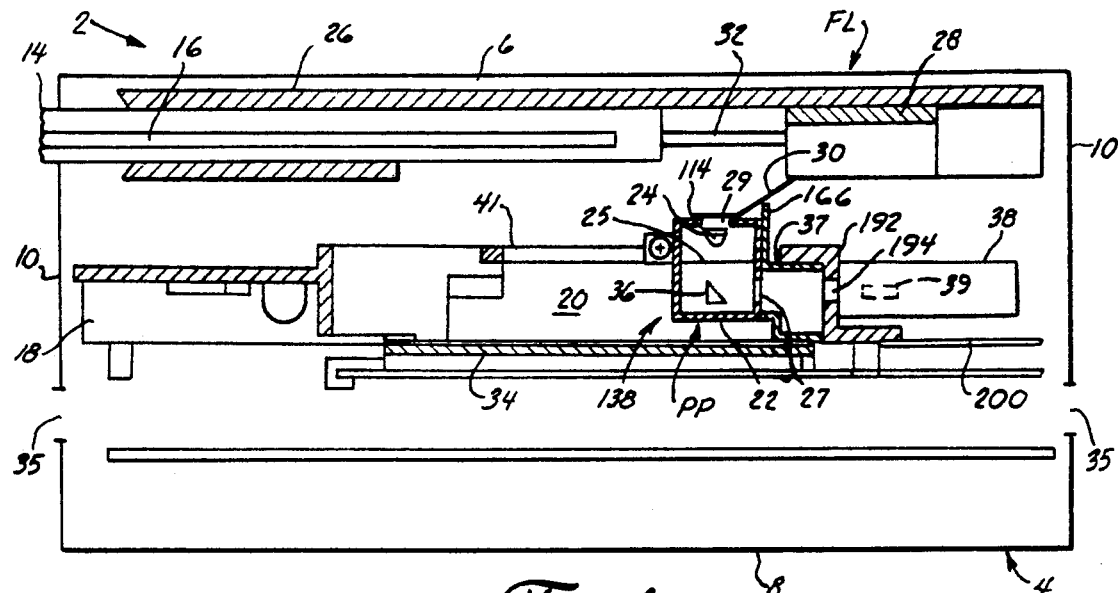
FIG. 1 is a schematic illustration of the invention with a cartridge partially loaded into the magneto-optic drive apparatus.
Figure 2:
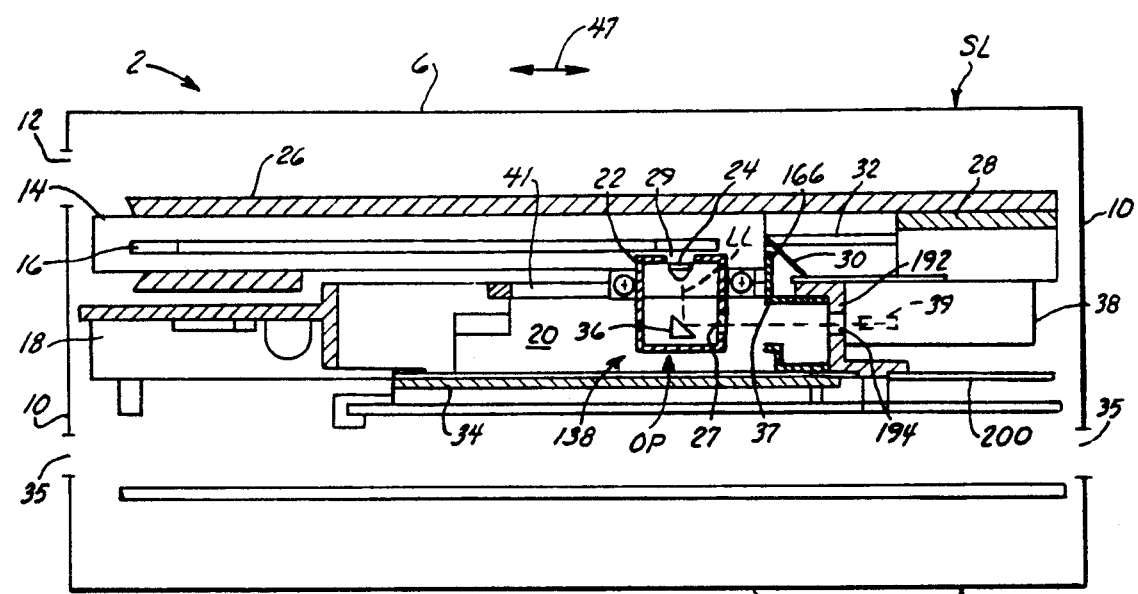
FIG. 2 is a schematic illustration of the invention with a cartridge fully loaded into the magneto-optic drive apparatus.

In FIG. 1, there is schematically illustrated magneto-optic drive apparatus 2 of this invention. A housing 4 is provided and has a top wall portion 6, a bottom wall portion 8 and sidewall portions 10. An opening 12 is formed in one of the sidewall portions 10 so that a cartridge 14 having a disk 16 contained therein may be loaded into the magneto-optic drive apparatus 2. Frame means 18 are fixedly mounted on the housing 4. The frame means 18 have an opening 20 in which are mounted support means 22 for supporting an optical assembly 138 comprising a read/write lens 24 and turning lens 36 and lens enclosure 22 for movement between a parked position PP (FIG. 1) and an operating position OP (FIG. 2). The lens enclosure 22 may comprise a right regular parallelepiped shaped member having an interior cavity for receiving the read/write lens 24 and the turning lens 36. The lens enclosure member 22 has a rear opening 27 therein adjacent a turning lens 36 and a top opening 29 therein adjacent a read/write lens 24 but is otherwise closed on all sides. The optical assembly 138 including enclosure member 22, read/write lens 24 and turning lens 36 is sometimes referred to herein as an optical head 138. Optical heads such as described generally above are known in the art. See for example U.S. Pat. No. 4,977,549 of Thomas E. Berg for WRITE AND ERASE MAGNETIC BIAS FIELD SWITCHING SYSTEM FOR A MAGNETO-OPTIC DISK DRIVE; issued Dec. 11, 1990 which is hereby specifically incorporated by reference for all that it describes.

Figure 3:
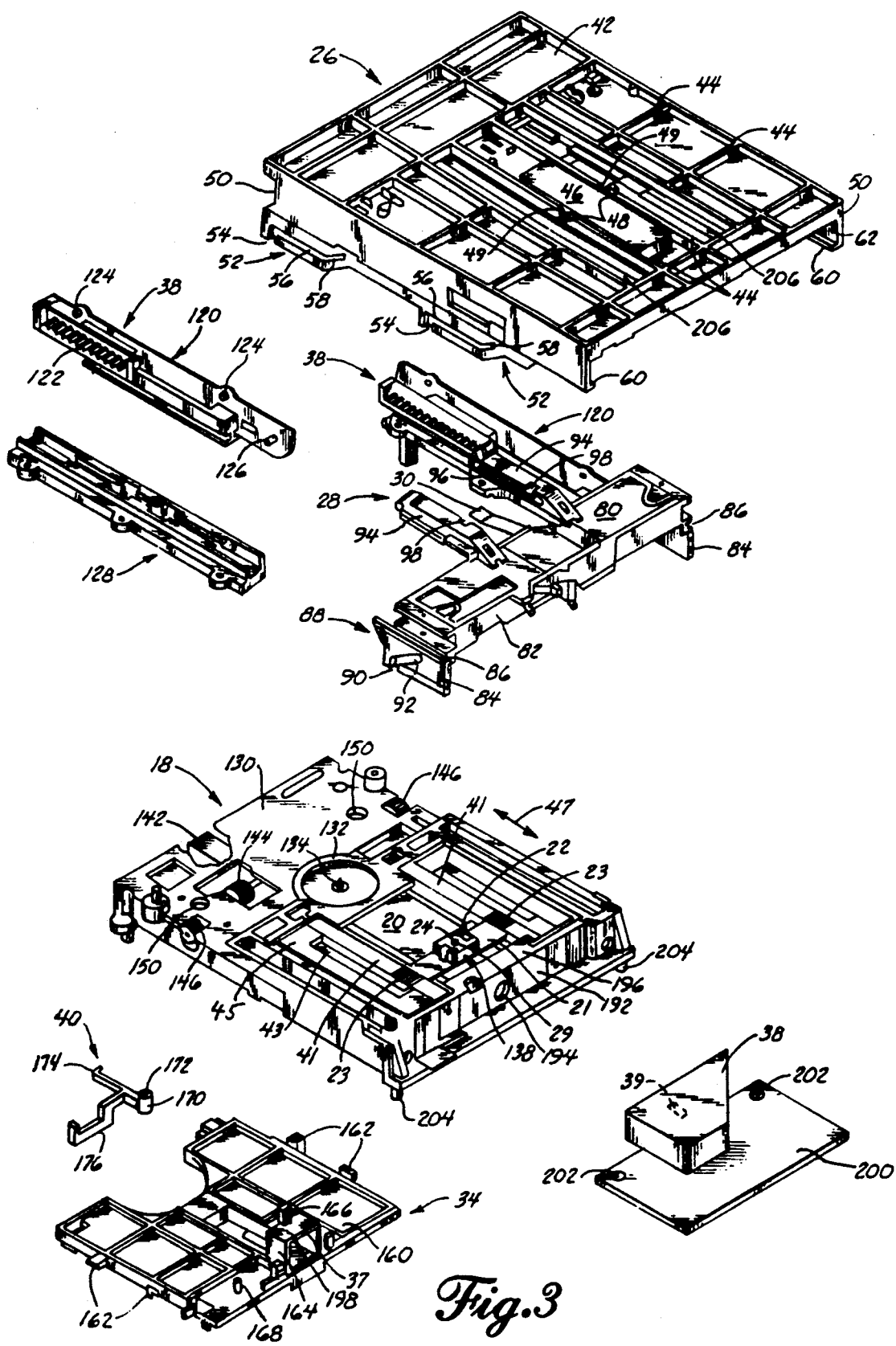
FIG. 3 is an exploded top perspective view of several portions of the apparatus of this invention.

As best shown in FIG. 3 the lens enclosure member 22 is mounted on a cross member 21 which is in turn attached at opposite ends thereof to elective coils 23. The coils 23 encircle and are slidably mounted on the support means which may comprise elongate coil member 41. The coil members 41 are magnetized by a permanent magnet 43 and associated pole piece 45. By providing current through coils 23 in an opposite direction the coils and thus the optical head 138 is selectively caused to move forwardly or rearwardly as indicated at 47. Such displaceable assembly for an optical head is generally referred to as a linear motor and is conventional and well known in the art.

A carrier 26 is mounted on the frame means 18 and is connected thereto to permit the carrier 26 to move in vertical directions relative to the frame means 18 but to prevent substantially any relative movement between the carrier 26 and the frame means 18 in horizontal directions. A shuttle 28 is mounted on the carrier 26 so that the shuttle 28 may move in linear horizontal directions relative to the carrier 26 and in linear vertical directions with the carrier 26. A strip 30 of flexible resilient material is secured to the shuttle 28 for movement therewith. The shuttle 28 moves between a first location FL (FIG. 1) whereat a portion of the strip of relatively flexible material 30 covers the read/write lens 24 and a second location SL (FIG. 2) whereat it permits the operation of the read/write lens 24. Pivotally attached to the shuttle 28 are shutter operating arms 32 (FIG. 4) which function to open or close a shutter, described below, on the cartridge 14.

The turning lens 36 is protected when in the parked position by a protection means 37 mounted at a fixed location. The protection means 37 may comprise a tunnel structure 164, FIG. 3, which abuts at an open end thereof against a rear wall portion of the support means 22 in the area around opening 27 to provide a cover extending horizontally outwardly from opening 27. The protection means 37 protects the turning lens 36 and also optical components in optical module 38 from dust. The optical module 38 is mounted at a fixed location and has a laser light source (not shown) and splitting lens 39 mounted therein. A laser path LL extends from the laser through the splitting lens 39, the turning lens 36 and the read/write lens 24 to the disk 16 during a reading or writing operation. In operation, the shuttle 28, in an unloaded state, is located in the position illustrated in FIG. 1 with the strip 30 of flexible material covering the read/write lens 24. A cartridge 14 is inserted into the carrier 26 and moves into contact with the shutter operating arms 32. As the cartridge 14 continues to be inserted, the shutter operating arms 32 function to open the shutter, which position is illustrated in FIG. 1. When the shutter has been fully opened, a signal is generated and functions to start an electric motor, described below. The electric motor moves the shuttle 28 from the first location FL, FIG. 1, to the second location SL, FIG. 2. The continued operation of the electric motor moves the carrier 26 and the shuttle 28 downwardly from the position illustrated in FIG. 1 to the position illustrated in FIG. 2. At the same time, the optical head 138 including the read/write lens 24 and turning lens 36 move from the parked position PP of FIG. 1 to the operating position OP of FIG. 2. The optical head 138 and other components of the apparatus 2 then function to perform a reading or writing operation. After the reading or writing operation has been performed, an eject button (not shown) is pushed to activate the electric motor. The read/write lens and turning lens are then returned to the parked position, the carrier 26 and the shuttle 28 are moved upwardly, the shuttle 28 is moved back to its position of FIG. 1 so that the portion of the strip of flexible resilient material is covering the read/write lens 24 and so that protection means 37 encompasses opening 27 to protect turning lens 36. The cartridge 14 is then pulled out of the carrier 26. As the cartridge 14 is pulled out, the shutter operating arms 32 function to close the shutter. Thus, the portion of the strip 30 of flexible resilient material 30 functions to cover the read/write lens 24 and protection means 37 protects the turning lens 36 at all times when the optical head 138 is in the parked position to prevent dust from falling thereon including the period when the drive is being loaded with a cartridge, the period when a cartridge is being unloaded from the drive and also the period between unloading of one cartridge and loading of the next cartridge. A dust air baffle 34 covers the lower part of the opening 20 to prevent dust from cooling air flowing through openings 35 in the sidewall portions 10 from contaminating the read/write lens 24 or turning lens 36.

In FIG. 3, there is illustrated the carrier 26, the carrier and shuttle moving means 38, the shuttle 28, the frame 18, the dust air baffle 34 and the releasable locking means 40. The carrier 26 has a top wall portion 42 with reinforcing bars 44 dividing it into a plurality of compartments. Write and erase magnet assembly 46 is mounted in one of the compartments and has two studs 48 projecting outwardly from opposite sides and extending through recesses 49 for purposes described below. Two sidewall portions 50 extend downwardly from the top wall portion 42 and each sidewall portion has two spaced apart cam grooves 52 formed therein. Each cam groove 52 has an entrance portion 54, a generally horizontal portion 56 and an inclined portion 58. Each sidewall portion 50 has a horizontally extending support rail 60 on its inner surface 62 for purposes described below. The carrier 26 has a bottom wall portion 64 (FIG. 4) that cooperates with the top wall portion 42 and the sidewall portions 50 to form an opening 66 through which the cartridge 14 is inserted, FIG. 4. The bottom wall portion 64 also functions to support the cartridge 14. A pair of spaced apart posts 68, FIG. 4, project downwardly from the bottom wall portion 64 for purposes described below.

Figure 4:
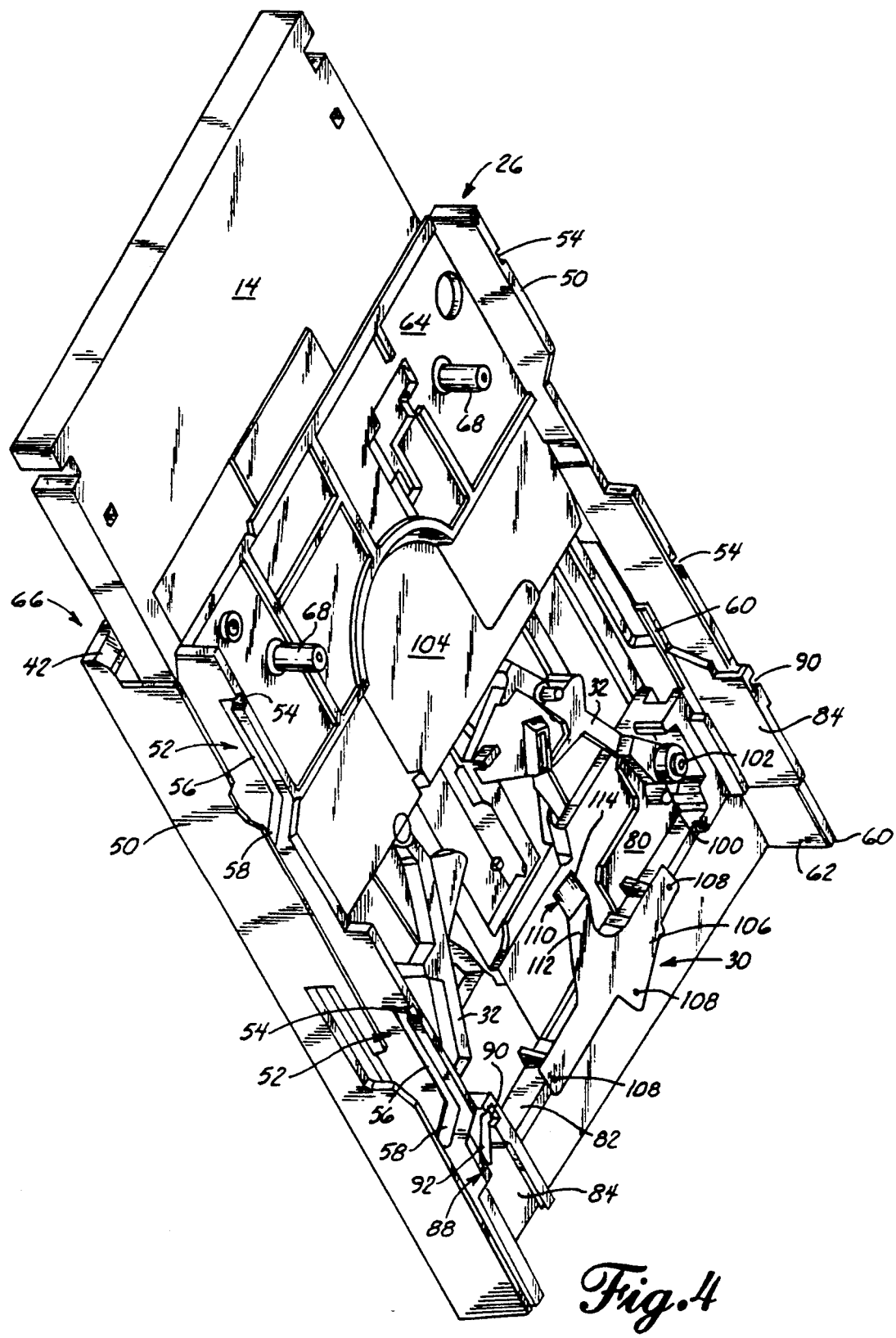
FIG. 4 is a bottom perspective view of some of the portions of FIG. 1.

The shuttle 28 has a top wall portion 80, FIGS. 3 and 4, a back wall portion 82, and two sidewall portions 84. A groove 86 is formed in each sidewall portion 84 and is dimensioned so that the rail 60 fits therein to support the shuttle 28 for sliding movement. A cam groove 88 is formed in each sidewall portion 84 and has an entrance portion 90 and an inclined portion 92 for purposes described below. A pair of spaced apart arms 94, FIG. 3, project outwardly from the top wall portion 80 and each arm 94 has a groove 96 formed therein and each groove 96 is dimensioned to receive a stud 48 for permitting limited movement therein. Each groove 96 has an entrance portion 98. Conventional shutter operating arms 32 are mounted on posts 100, one of which is illustrated in FIG. 4, and are urged in directions away from each other by spring means 102. As described above, as the cartridge is inserted into the magneto-optic drive apparatus 2, the shutter operating arms function to open the shutter 104, FIG. 4. The strip 30 of flexible material has a base portion 106 that is secured to the back wall portion 82 by suitable means, such as an adhesive or rivets 108. A tongue portion 110 projects outwardly from the base portion 106 and has an inclined portion 112 and a generally horizontal portion 114 FIGS. 1 and 4.

As shown in FIG. 3, the carrier and shuttle moving means 38 has a pair of elongated bars 120, each of which has a rack gear 122 mounted thereon. Each elongated bar 120 has a pair of spaced apart cam followers 124 which are dimensioned to fit into the cam grooves 52 and a cam follower 126 which is dimensioned to fit into cam groove 88. Each elongated bar 120 is mounted on a base member 128 which is secured on the frame means 18 to provide for linear sliding movement of the elongated bar 120 on the base member 128.

The frame means 18 comprises a casting 130 having a cavity 132 formed therein and in which the drive means 134 are positioned. As previously described, the support means, which comprise a pair of spaced apart rails 41, are mounted in the opening 20 and the optical assembly 138 is mounted for sliding movement over the rails 41. The read/write lens 24 is beneath an opening 29 in the lens enclosure member 22 of the optical assembly 138. Coils 23 are controllably energized to control the movement of the optical assembly 138 over the rails 41.

A reversible electric motor 142 is mounted on the casting 130 and is connected to gears 144 which function to rotate pinion gears 146 which are in mesh with rack gears 122 so that rotation of the reversible electric motor 142 moves the elongated bars 120. A pair of spaced apart openings 150 are formed in the casting 130 and are dimensioned to receive the posts 68 of carrier 26, FIG. 4, so as to prevent any substantial horizontal movement between the casting 130 and the carrier 26 but to permit movement of the carrier 26 in generally vertical directions relative to the casting 130.

The dust air baffle 34 comprises a plate member 160 that is dimensioned to cover the opening 20 in the casting 130. The plate member 160 has a plurality of lugs 162 for securing it to the bottom surface of the casting 130. The protection means 37 comprises a tunnel structure 164 which projects upwardly from the plate member 160 and an abutment member 166 projects upwardly from the tunnel structure 164 for purposes described below. A post 168 projects upwardly from the plate member 160. The releasably locking means 40 has a portion 170 having a bore 172 extending therethrough and dimensioned to receive the post 168 and be rotatably mounted thereon. A hook portion 174 projects outwardly from the portion 170 and is located to engage a portion of the optical assembly 138 to hold it in the parked position of FIG. 1. A release lever 176 extends outwardly from the portion 170 and is located to be contacted by a portion of the shuttle 28 as it moves from the first location FL to the second location SL.

The optical module 38 is mounted on the sidewall 192 of the frame means 18 by suitable means (not shown) so that the splitting lens 39 is aligned with the opening 194 in the sidewall 192. A flange portion 196 projects inwardly from the sidewall 192. When the dust cover 34 is mounted on the frame means 18, the upper surface 198 of the tunnel structure 164 contacts the lower surface of the flange portion 196. An air baffle 200 is located below the optical module 38 and has openings 202 so that the air baffle 200 can be mounted on the studs 204 on the frame means 18. The magneto-optic drive apparatus 2 is assembled by passing the support arms 94 upwardly through slots 206. The shuttle 28 is rotated to align the grooves 86 with the support rails 60. The shuttle 28 is moved forwardly until it is supported on the support rails 60. The shuttle 28 is move to align the recesses 49 with the openings 98. The studs 48 of the write and erase magnet 46 are passed through the aligned recesses 49 and the openings 98. The shuttle is then moved so that the studs 48 move into the grooves 96. The entrance portions 54 on the carrier 26 are aligned with the cam followers 124 and the entrance portion 90 on the shuttle 28 is aligned with the cam follower 126 and the carrier 26 and shuttle 28 are moved downwardly so that the cam followers 124 enter the cam grooves 88 and the posts 68 move into the openings 150. This locates the apparatus as illustrated schematically in FIG. 1.

When it is desired to perform a reading or writing operation, a cartridge 14 is inserted into the carrier 26, FIG. 1. As the cartridge moves inwardly it contacts the shutter operating arms 32, FIGS. 1 and 4 and the continued movement of the cartridge 14 opens the shutter 104. At this time, signal generating means (not shown) start the electric motor 142 which rotates pinion gears 146 to move the rack gear 122 and the cam followers 124 and 126, FIG. 3. The cam followers 124 move along the horizontal portions 56 so that they apply no force on the carrier 26. The cam follower 126 applies a force on the shuttle 28 to move the shuttle rearwardly. As the shuttle 28 moves rearwardly, the tongue portion 110 is gradually moved so that it no longer covers the read/write lens 24 and contacts the release lever 176 to release the locking means 40. The movement of the rack gear 122 is continued and the cam followers 124 begin to move over the inclined portions 58 and the cam followers 126 move over the inclined portions 92 to move the carrier 26 and the shuttle 28 downwardly toward the read/write lens 24. The downward movement is stopped when the carrier 26 and the shuttle 28 are located as schematically illustrated in FIG. 2. As the shuttle 28 moves downwardly, the tongue portion 110 contacts the abutment member 166 and is pivoted around a generally horizontal axis to move upwardly to a position where it will not interfere with the operation of the read/write lens 24. After the reading or writing operation has been completed the read/write lens 24 is moved to the parked position PP, the electric motor is actuated and the rack gear 122 moves in the opposite direction. The carrier 26 and the shuttle 28 move upwardly and the shuttle 28 moves forwardly to move the cartridge 14 slightly out of the housing and to move the tongue portion 110 into the protecting position over the read/write lens 24. The cartridge 14 is then removed from the carrier 26 and as it is removed the shutter operating arms 32 function to close the shutter 104. Therefore, when the optical assembly 138 is in the parked position, the read/write lens 24 is protected by the tongue portion 110. The optical assembly 38 remains in the parked position during the opening and closing of the shutter 104 associated with the loading and removal of a cartridge into and out of the drive. The optical assembly 138 also remains in the parked position during periods when there is no cartridge in the drive apparatus 2. The read/write lens 24 is protected by tongue portion 110 and the turning lens 36 is protected by member 37 during all of these periods.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A magneto-optic drive apparatus comprising:
   drive means for rotating a disk contained in a cartridge;
   an optical assembly mounted on support means for movement in linear directions between an operating position and a parked position and including a read/write lens for focusing laser light for reading or writing information from or to said disk;
   said operating position being located between said drive means and said parked position;
   protection means for protecting said read/write lens when in said parked position; and
   mounting means for mounting said protection means for movement relative to said optical assembly.

2. Apparatus as in claim 1 wherein:
   said mounting means moving said protection means between a first location whereat at least a portion of said protection means protects said read/write lens and a second location whereat said protection means permits operation of said read/write lens and said disk for reading or writing information from or to said disk.

3. Apparatus as in claim 1 wherein:
   said optical assembly also including a turning lens and further comprising;
   additional protection means for protecting said turning lens when said optical assembly is in said parked position.

4. Apparatus as in claim 1 wherein:
   said cartridge having at least one shutter mounted for movement between a closed position and an opened position;
   moving means for moving said at least one shutter between said closed and opened positions; and
   said moving means being constructed and arranged to operate only when said read/write lens is in said parked position and said protection means is at said first location.

5. Apparatus as in claim 4 an further comprising:
   mounting means for mounting said protection means for movement between a first location whereat at least a portion of said protection means protects said read/write lens and a second location whereat said protection means permits operation of said read/write lens and said disk for reading or writing information from or to said disk.

6. Apparatus as in claim 4 and further comprising:
   a housing;
   frame means mounted at a fixed location in said housing;
   a carrier;
   connecting means for connecting said carrier to said frame means to permit relative linear movement therebetween in generally vertical directions but to prevent any substantial relative linear movement therebetween in horizontal directions;
   said mounting means includes a shuttle mounted on said carrier for movement relative thereto in generally horizontal linear directions; and
   cam means for moving said shuttle in said generally horizontal linear directions relative to said carrier.

7. Apparatus as in claim 6 and further comprising:
   additional cam means for moving said carrier in said generally vertical directions.

8. Apparatus as in claim 7 wherein said cam means and said additional cam means comprises:
cam grooves formed in said carrier and said shuttle;
cam followers mounted for movement in horizontal linear directions on said frame means and having at least a portion thereof located in said cam grooves;
a rack fixedly mounted on said cam follower;
a motor mounted on said frame means; and
rotatable gear means mounted on said motor to rotate a pinion gear in mesh with said rack to move said rack over said frame means so that said cam follower moves said shuttle in said generally horizontal direction and then moves said carrier and said shuttle in said generally vertical linear directions.

9. Apparatus as in claim 7 wherein:
said read/write lens being located beneath an opening in said optical assembly; and
said protection means comprising a strip of flexible, resilient material covering said opening when in said parked position.

10. Apparatus as in claim 9 and further comprising:
an abutment mounted on said frame means;
said mounting means being located at said second location when said carrier and said shuttle are moving in said linear vertical directions; and
said abutment located on said frame means so that when said carrier and said shuttle are moving downwardly toward said frame means, said strip of flexible material will contact said abutment and pivot around a generally horizontal axis so that a free end of said strip of flexible material is moving generally upwardly away from said frame means.

11. Apparatus as in claim 9 and further comprising:
locking means for releasably locking said optical assembly in said parked position; and
release means for releasing said locking means as said shuttle moves from said first location to said second location.

12. A magneto-optic drive apparatus comprising:
a housing having top wall, bottom wall, and sidewall portions;
frame means mounted at a fixed location in said housing and spaced from said top and bottom wall portions;
drive means mounted on said frame means for rotating a disk contained in a cartridge;
said frame means having an opening formed therein;
an optical assembly mounted on support means in said opening for movement in linear directions between an operating position and a parked position and comprising a read/write lens mounted in said optical assembly for focusing laser light for reading or writing information from or to said disk;
baffle means secured to said frame means and facing said bottom wall portion;
said baffle means located to close substantially the bottom portion of said opening; and
openings in said sidewall portions for passing cooling air between said baffle means and said bottom wall portion.

13. Apparatus as in claim 12 and further comprising:
said operating position being located between said drive means and dais parked position;
protection means for protecting said read/write lens when in said parked position; and
mounting means for mounting said protection means for movement relative to said optical assembly.

14. Apparatus as in claim 12 wherein:
mounting means for mounting said protection means for movement between a first location whereat at least a portion of said protection means protects said read/write lens and a second location whereat said protection means permits operation of said read/write lens and said disk for reading or writing information from or to said disk.

15. Apparatus as in claim 13 wherein:
said cartridge having at least one shutter mounted for movement between a closed position and an opened position;
moving means for moving said at least one shutter between said closed and opened positions; and
said moving means being located to operate only when said read/write lens is in said parked position and said protection means is at said first location.

16. Apparatus as in claim 15 and further comprising:
a carrier;
connecting means for connecting said carrier to said frame means to permit relative linear movement therebetween in generally vertical directions but to prevent any substantial relative linear movement therebetween in horizontal directions;
said mounting means comprises a shuttle mounted on said carrier for movement relative thereto in generally horizontal linear directions;
cam means for moving said shuttle in said generally horizontal linear directions relative to said carrier.
additional cam means for moving said carrier in said generally vertical directions.

17. Apparatus as in claim 16 wherein said cam means and said additional cam means comprises:
cam grooves formed in said carrier and said shuttle;
cam followers mounted for movement in horizontal linear directions on said frame means and having at least a portion thereof located in said cam grooves;
a rack fixedly mounted on said cam follower;
a motor mounted on said frame means; and
rotatable gear means mounted on said motor to rotate a pinion gear in mesh with said rack to move said rack over said frame means so that said cam follower moves said shuttle in said generally horizontal direction and then moves said carrier and said shuttle in said generally vertical linear directions.

18. A method for protecting a read/write lens of a magneto-optic drive apparatus having frame means; drive means mounted on said frame means for rotating a cartridge having a disk contained therein; an optical assembly including said read/write lens mounted on support means in an opening in said frame means for movement between a parked position and an operating position and protection means mounted for movement between a first location whereat at least a portion of said protection means covers the read/write lens and a second location whereat said protection means permits operation of the read/write lens and the disk for reading or writing from or to the disk comprising:
locating said read/write lens in said parked position and said protection means in said first location;
inserting said cartridge having a shutter which moves between closed and opened positions into said magneto-optic drive apparatus;
moving said shutter from said closed position to said opened position as said cartridge is inserted into said magneto-optic drive apparatus;
moving said protection means from said first location to said second location after said shutter has been opened;

moving said read/write lens from said parked position to said operating position;

performing said reading or writing operation;

moving said read/write lens from said operating position to said parked position;

moving said protection means from said second location to said first location;

removing said cartridge from said magneto-optic drive apparatus; and moving said shutter from said opened position to said closed position as said cartridge is removed from said magneto-optic drive apparatus.

19. The method as claim 18 wherein said step of performing said reading or writing operation comprises:

moving said cartridge downwardly until it is in a position to permit rotation of said disk;

moving said read/write lens to said parked position after said reading or writing operation has been performed; and moving said cartridge upwardly prior to moving said protection means from said second location to said first location.

20. The method as in claim 18 and further comprising:

providing a baffle to close the end of said opening remote from said read/write lens; and passing cooling air over said baffle.

* * * * *